UNITED STATES PATENT OFFICE

AUGUST ZINSSER, OF NEW YORK, N. Y.

IMPROVEMENT IN REFRIGERATORS.

Specification forming part of Letters Patent No. 209,314, dated October 22, 1878; application filed July 11, 1878.

*To all whom it may concern:*

Be it known that I, AUGUST ZINSSER, of the city, county, and State of New York, have invented a new and useful Improvement in Refrigerators, of which the following is a specification:

This invention relates to an improvement in the inclosing-walls of refrigerators; and it consists in providing the double inclosing-walls of a refrigerator with a filling composed of a resinous substance, such as the rosin or colophony of commerce, pitch, lac, or similar rosin, or such resinous substance mixed with a granulated or pulverized non-heat-conducting substance, such as sawdust, spent tan-bark, or gypsum.

In carrying out my invention I take a sufficient quantity of the resinous substance, such as rosin or its equivalent, melt it and pour it into the hollow or double wall with which refrigerators are usually provided, so as to completely fill the space between the outer and inner members of said wall, which may then be capped or covered in any suitable and known manner; or, if preferred, for economy, I may add to the melted resinous substance about half its bulk of sawdust, spent tan-bark, gypsum, or other cheap powdered or granulated substance which is a poor conductor of heat. By this means I produce refrigerator-walls which are not only very efficient in resisting the transfer of heat, but are at the same time air-tight, and which in practical use have been found to effect a considerable saving of ice as compared with walls filled in the ordinary manner.

I do not claim a resinous substance mixed with a woody substance, *per se*, as I am aware that such mixture has been used as fuel.

What I claim is—

A refrigerator having a double or hollow inclosing-wall filled with a resinous substance, substantially as described.

AUG. ZINSSER.

Witnesses:
 AUG. C. LOOS,
 ERNST VOLKMANN.